United States Patent
Toppinen et al.

(10) Patent No.: US 8,081,979 B2
(45) Date of Patent: Dec. 20, 2011

(54) BLOCKING OF SERVICE IN CELLULAR RADIO SYSTEM

(75) Inventors: Hannu Toppinen, Kempele (FI); Janne Pauna, Tupos (FI)

(73) Assignee: Nethawk Oyj, Oulu (FI)

( * ) Notice: Subject to any disclaimer, the term of this patent is extended or adjusted under 35 U.S.C. 154(b) by 469 days.

(21) Appl. No.: 12/425,802

(22) Filed: Apr. 17, 2009

(65) Prior Publication Data
US 2009/0305702 A1 Dec. 10, 2009

(30) Foreign Application Priority Data
Jun. 10, 2008 (EP) .................................. 08157911

(51) Int. Cl.
*H04W 4/00* (2009.01)
(52) U.S. Cl. .................. 455/435.2; 455/422.1; 455/423; 455/418; 455/466
(58) Field of Classification Search ............... 455/435.2, 455/422.1, 423, 418, 466
See application file for complete search history.

(56) References Cited

U.S. PATENT DOCUMENTS
7,489,927 B2 * 2/2009 Dhillon .......................... 455/430
2008/0020749 A1 1/2008 Delaveau et al.

FOREIGN PATENT DOCUMENTS
EP 1 051 053 A2 11/2000
FR 2 869 189 A 10/2005
WO 2007/010223 A1 1/2007

OTHER PUBLICATIONS

"3rd Generation Partnership Project; Technical Specification Group Services and System Aspects; 3G Security; Security architecture (Release 5)", 3GPP TS 33.102 V5.3.0 (Sep. 2003), pp. 1-61.
"3rd Generation Partnership Project; Technical Specification Group Services and System Aspects; Circuit Teleservices supported by a Public Land Mobile Network ) PLMN (Release 5)", 3GPP TS 22.003 V5.2.0 (Jun. 2002), pp. 1-21.
3rd Generation Partnership Project; Technical Specification Group Radio Access Network; User Equipment (UE) procedures in idle mode and procedures for cell reselection in connected mode (Release 5), 3GPP TS 25.304 V5.3.0 (Jun. 2003), pp. 1-41.

* cited by examiner

Primary Examiner — Nghi Ly
(74) Attorney, Agent, or Firm — Ladas & Parry LLP

(57) ABSTRACT

Blocking of service in cellular radio system. An apparatus comprises a processor configured to control a stand-alone base station so that an emulated cell is formed by transmitting a control channel with information of a real cell and with such a transmission power that a subscriber terminal of a cellular radio system is forced to camp in the emulated cell, and to control the stand-alone base station to block service from the subscriber terminal before an integrity protection process is performed between the stand-alone base station and the subscriber terminal.

13 Claims, 1 Drawing Sheet

BLOCKING OF SERVICE IN CELLULAR RADIO SYSTEM

FIELD

The invention relates to blocking of service in a cellular radio system.

BACKGROUND

Blocking of service is useful in some situations, such as in a concert or the like, where the use of subscriber terminals may cause inconvenience for the other.

BRIEF DESCRIPTION

The present invention seeks to provide an improved apparatus, method and computer program.

According to an aspect of the present invention, there is provided an apparatus as specified in claim 1.

According to another aspect of the present invention, there is provided a method as specified in claim 12.

According to another aspect of the present invention, there is provided a computer program as specified in claim 13.

LIST OF DRAWINGS

Figure 1:
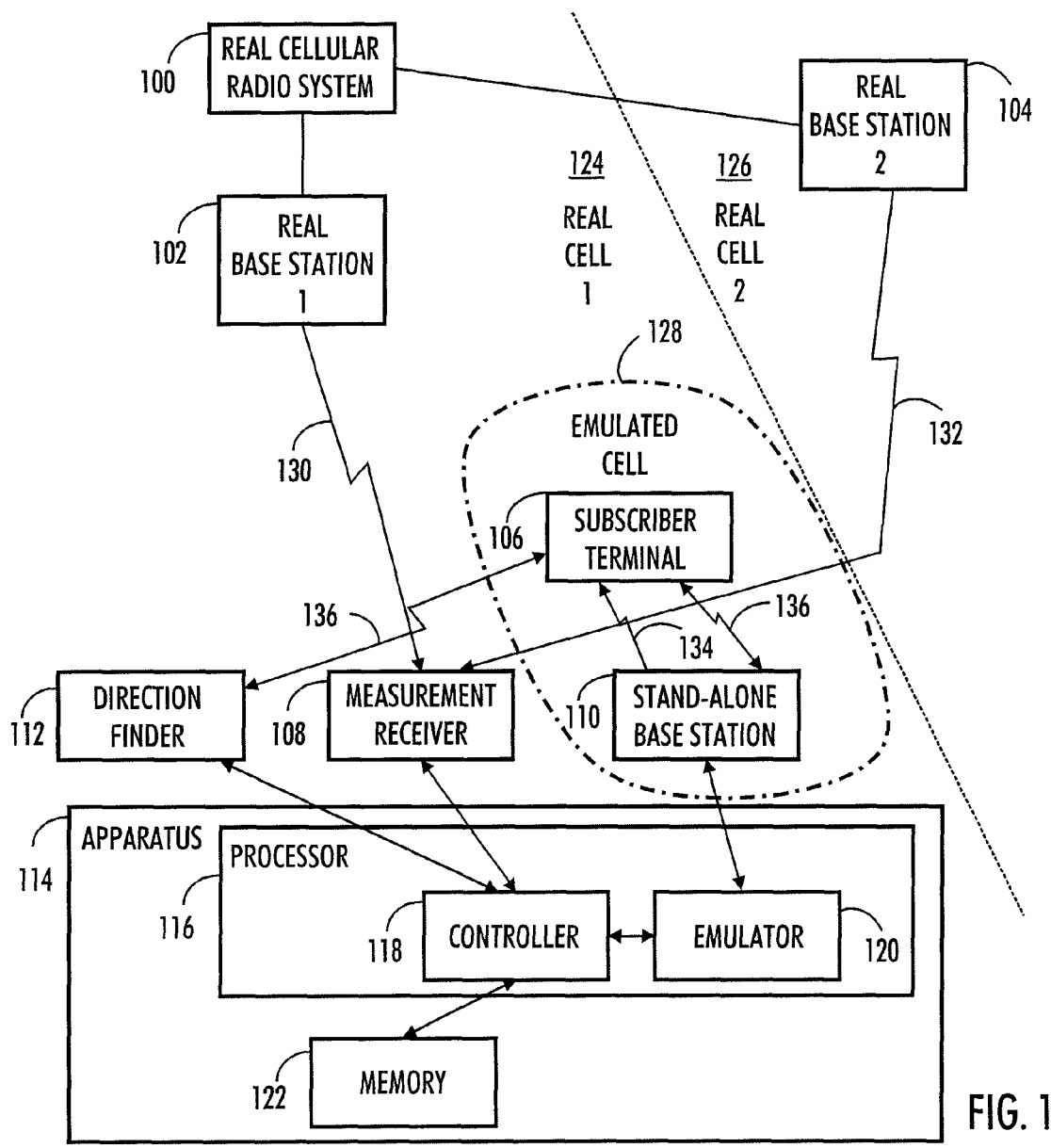
Figure 2:
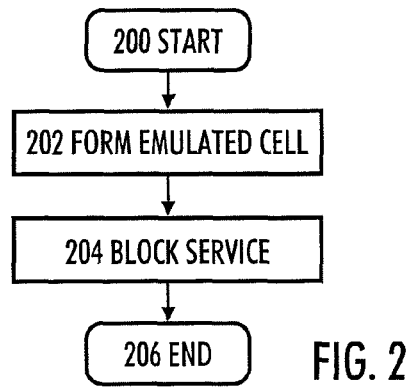

Embodiments of the present invention are described below, by way of example only, with reference to the accompanying drawings, in which FIG. 1 illustrates embodiments of an apparatus; and FIG. 2 illustrates an embodiment of a method.

DESCRIPTION OF EMBODIMENTS

The following embodiments are exemplary. Although the specification may refer to "an" or "one" embodiment(s) in several locations, this does not necessarily mean that each such reference is to the same embodiment(s), or that the feature only applies to a single embodiment. Single features of different embodiments may also be combined to provide other embodiments. The present invention is applicable to any cellular radio system that supports the functionality that will be described in the following. The protocols and specifications of cellular radio systems develop rapidly. Such development may require extra changes to an embodiment. Therefore, all words and expressions should be interpreted broadly and they are intended to illustrate, not to restrict, the embodiment.

FIG. 1 only shows some elements and functional entities, all being logical units whose implementation may differ from what is shown. The connections shown in FIG. 1 are logical connections; the actual physical connections may be different. Interfaces between the various elements may be implemented with suitable interface technologies, such as a message interface, method interface, sub-routine call interface, block interface, or any means enabling communication between functional sub-units. It should be appreciated that apparatuses may comprise other units. However, they are irrelevant to the actual invention and, therefore, they need not be discussed in more detail here. It is also to be noted that although some elements are depicted as separate (apparatus 114, direction finder 112, measurement receiver 108, stand-alone base station 110), some of them may be integrated together into a single physical element.

FIG. 1 shows two base stations 102, 104, both being part of a real cellular radio system 100. 'Real' refers to the fact that the cellular radio system 100 is authorized by the authorities and it provides continuous service for the users. Both base stations 102, 104 form real cells 124, 126.

The cellular radio system 100 may operate according to the GSM (Global System for Mobile Communications), WCDMA (Wideband Code Division Multiple Access), WLAN (Wireless Local Area Network) standard, or in any other suitable standard/non-standard way.

A subscriber terminal 106 is in the real cell 124 formed by the base station 102. The subscriber terminal 106 is a piece of equipment or a device that is configured to associate the subscriber terminal 106 and its user with a subscription and allows a user to interact with the cellular radio system 100, i.e. the subscriber terminal 106 is capable of requesting service from the cellular radio system 100. The subscriber terminal 106 presents information to the user and allows the user to input information. In other words, the subscriber terminal 106 may be any terminal capable of wirelessly receiving information from and/or wirelessly transmitting information to the cellular radio system 100. The subscriber terminal 100 may refer to a portable mobile communication device operating with or without a subscriber identification module (SIM), including, but not limited to, devices of the following type: mobile phone, smartphone, personal digital assistant (PDA), user equipment, or any other portable communication device possibly including computer functionalities or functionalities of other data processing devices.

The actual apparatus 114 for blocking a service in the cellular radio system 100 is also illustrated in FIG. 1. The apparatus 114 comprises a processor 116. The apparatus 114 may also comprise a memory 122 for saving settings data, information on blocked services, etc. The apparatus 114 may be of the type utilized in telecommunication testing and measurement. The apparatus 114 may be a measuring device, such as an analyzer. The apparatus 114 may for instance be a protocol analyzer used for measuring the operation of a data transmission system. The apparatus 114 may also be an interface card. The apparatus 114 may also be a computer provided with Microsoft Windows® or some other operating system and dedicated protocol analysis software. The apparatus 114 may further comprise a number of other devices, such as a user interface and communication equipment. The user interface allows controlling the operations of the apparatus 114 and monitoring the operations carried out by the apparatus 114. The user interface may comprise a display and keyboard, for example. Depending on the apparatus 114, the user interface may comprise various other user interface parts.

The processor 116 may be implemented as an electronic digital computer, which may comprise a working memory (RAM), central processing unit (CPU), and system clock. The CPU may comprise a set of registers, arithmetic logic unit, and control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C or Java, or a low-level programming language, such as a machine language, or an assembler. The electronic digital computer may also have an operating system, which may provide system services to a computer program written with the program instructions.

The processor 116 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 114, necessary processing capacity, production costs, and production volumes, for example.

The processor 116 is configured to perform various stages of the blocking of the service as will be described next.

The processor 116 is configured to control a stand-alone base station 110 in such a manner that an emulated cell 128 is formed by transmitting a control channel 134 with information of a real cell and with such a transmission power that the subscriber terminal 106 of the cellular radio system 100 is forced to camp in the emulated cell 128. In effect, the stand-alone base station 110 is configured to set parameters of the formed emulated cell 128 for masquerading a neighbour cell 126 so that the emulated cell 128 becomes a tempting destination for a cell reselection.

The processor 116 is also configured to control the stand-alone base station 110 to block service 136 from the subscriber terminal 106 before an integrity protection process is performed between the stand-alone base station 110 and the subscriber terminal 106. The service blocking may be done in the protocol layer three, or in the radio resource control protocol layer, for example.

An embodiment provides a computer program on a carrier and comprising computer executable instructions for causing an apparatus 114 to control a stand-alone base station so that an emulated cell is formed by transmitting a control channel with information of a real cell and with such a transmission power that a subscriber terminal of a cellular radio system is forced to camp in the emulated cell, and to control the stand-alone base station to block service from the subscriber terminal before an integrity protection process is performed between the stand-alone base station and the subscriber terminal.

The blocking of service may operate within one cellular radio system 100, or it may be implemented simultaneously to more than one cellular radio system 100, i.e. more than one stand-alone base station 110 may be needed in order to form more than one emulated cell 128. The processor may also be configured to control the stand-alone base station 110 to operate as a wideband code division multiple access cell, and, if the subscriber terminal 106 switches from the wideband code division multiple access cell to a time division multiple access cell, to control the stand-alone base station 110 or another stand-alone base station (not illustrated in FIG. 1) to emulate that time division multiple access cell.

In the cellular radio system 100, entering of subscriber terminals 106 and the identifications thereof to an unauthorized network that is not part of the network of a public operator has been inhibited. For example, in 3G (3rd generation mobile communications) systems, there is a procedure called integrity protection that enables the subscriber terminals 106 to verify that they are connected to the actual 3G network. This is done by appending a message authentication code calculated over the sent messages and checking the authentication code at the receiving end. The message authentication code is calculated by using a secret key of the subscriber terminal 106 that is only known by the subscriber terminal 106 itself and by an authorized network.

Integrity protection is used to protect sensitive messages exchanged between subscriber terminals 106 and a radio network controller. It prevents subscriber terminals 106 from continuing communication up to the call setup phase, for example. If the integrity protection is not turned on by the network after radio resource control connection setup, the subscriber terminal 106 will release the connection. The stand-alone base station 110 blocks the service from the subscriber terminal 106 by creating the emulated cell 128, and after the subscriber terminal 106 has camped into the emulated cell 128, originating and terminating calls are blocked by using both messages where integrity protection is not used and exceptions in integrity protection usage.

The same location area code as in the serving cell 124 is used to prevent subscriber terminals 106 camped into the emulated cell 128 to start a location area update procedure to update the location registration. Location area update without integrity protection is possible when the registration information is not updated.

According to TS (Technical Specification) 33.102/5.3.0, all signaling messages except the following ones shall be integrity protected:
  HANDOVER TO UTRAN COMPLETE
  PAGING TYPE 1
  PUSCH CAPACITY REQUEST
  PHYSICAL SHARED CHANNEL ALLOCATION
  RRC CONNECTION REQUEST
  RRC CONNECTION SETUP
  RRC CONNECTION SETUP COMPLETE
  RRC CONNECTION REJECT
  RRC CONNECTION RELEASE (CCCH only)
  SYSTEM INFORMATION (BROADCAST INFORMATION)
  SYSTEM INFORMATION CHANGE INDICATION
  TRANSPORT FORMAT COMBINATION CONTROL (TM DCCH only)

There are four exceptions when it is not mandatory to start integrity protection:
  If the only purpose of the signaling connection establishment and the only result is periodic location registration, i.e. no change of any registration information.
  If there is no MS-VLR/SGSN signaling after the initial L3 signaling message sent from MS to VLR/SGSN, i.e. in the case of deactivation indication sent from the MS followed by connection release.
  If the only MS-VLR/SGSN signaling after the initial L3 signaling message sent from MS to VLR/SGSN, and possible user identity request and authentication (see below), is a reject signaling message followed by a connection release.
  If the call is an emergency call teleservice as defined in TS 22.003.

Some embodiments may utilize the above-described qualities of integrity protection. It is to be noted that emergency calls may be allowed, i.e. the blocking of service may not apply to them. The processor 116 may be configured to control the stand-alone base station 110 so that information transmitted in the control channel is modified not to allow an emergency call by the subscriber terminal 106 in the emulated cell 128 in order to force the subscriber terminal 106 to start an emergency call in the real cell 124. According to TS 25.304, section 5.3.1.3 (Emergency Call): "A restriction on emergency calls, if needed, shall be indicated in the "Access class barred list" IE [4]. If access class 10 is indicated as barred in a cell, UEs with access class 0 to 9 or without an IMSI are not allowed to initiate emergency calls in this cell. For UEs with access classes 11 to 15, emergency calls are not allowed if both access class 10 and the relevant access class (11 to 15) are barred. Otherwise, emergency calls are allowed for those UEs."

In an embodiment, the processor 116 is configured to control the stand-alone base station 110 to block the service from the subscriber terminal 106 so that a service request message is received from the subscriber terminal 106 and a service reject message is transmitted to the subscriber terminal 106. Whenever call establishment is started and a CM SERVICE REQUEST message is received from the subscriber terminal 106, CM SERVICE REJECT with a suitable cause code (Network busy/Collision, for example) may be sent in reply in order to prevent the subscriber terminal 106 from continuing call establishment. When replying with CM SERVICE REJECT, a message authentication code is not needed in the message, and the subscriber terminal 106 handles the message and cancels the call establishment.

If network access for the subscriber terminal 106 is allowed, CM SERVICE ACCEPT may be sent in reply. The subscriber terminal 106 will then notice that the message authentication code used in the message is not valid and selects another network cell, whereby the service blocking ends.

In case emergency calls are enabled from blocked area, access class 10 is indicated as barred, causing a new cell to be searched when an emergency call is initiated.

A GSM network may also be blocked. Because there is no integrity protection in a GSM network, blocking can be made controllable, i.e. IMSI and IMEI can be asked from the subscriber terminal 106, and a call can be routed through a relay terminal to the real network. Such a system is presented in EP1051053.

The stand-alone base station 110 may be implemented just like the real base station 102. 'Stand-alone' refers to the fact that the stand-alone base station 110 is not part of the real cellular radio system 100 and it does not provide continuous service for the users. The purpose of the stand-alone base station 110 is to block the service from the users.

As illustrated in FIG. 1, the service blocking functionalities may be divided into two parts in the processor 116: an emulator 120, which simulates the necessary network functions (a radio network controller, for example) of the cellular radio system 100 towards the stand-alone base station 110 and the subscriber terminal 106, and a controller 118, which controls the emulator 120 and receives information about the cellular radio system 100.

The controller 118 may obtain the information about the cellular radio system 100 from a suitable source: from another apparatus via a communication interface (not illustrated in FIG. 1), from a user of the apparatus 114 via its user interface (not illustrated in FIG. 1), or from a measurement receiver 108.

The measurement receiver 108 may be implemented on a platform provided by a normal mobile telephone. The measurement features/parts may easily be implemented on top of the platform with suitable software and hardware components. All modifications and configurations required for implementing functionality may be performed as routines which may be implemented as added or updated software routines, application circuits (ASIC) and/or programmable circuits, for example.

The processor 116 may be configured to control the measurement receiver 108 to measure 130, 132 real cells 124, 126 of the cellular radio system 100, and to select one of the measured real cells 124, 126 as the emulated cell 128. The measurement receiver 108 may be configured to measure parameters of a serving cell 124 required for camping in the neighbour cells of the serving cell, and to camp in the neighbour 126 cells in order to store reception quality and a neighbour cell list from the neighbour cells by using the measured parameters.

The processor 116 may be configured to select as the emulated cell 124 a real cell whose reception power at the measurement receiver 108 is lower than the reception power of the best received cell at the measurement receiver 108 and whose location area code (LAC) is the same as the location area code of the best received cell.

Let us suppose that the reception power of the real cell 124 is higher than the reception power of the real cell 126 at the measurement receiver 108. Let us also suppose that both real cells 124 and 126 have the same location area code. With these suppositions, the processor 116 will select the real cell 126 as the emulated cell 128, i.e. the stand-alone base station 110 will form the emulated cell 128 by transmitting a control channel 134 with information of the real cell 126.

The stand-alone base station 112 will transmit the control channel 134 with such a transmission power that the subscriber terminal 106 is forced to camp in the emulated cell 128. This forced camping may be achieved so that the reception power of the emulated cell 128 is higher than the reception power of the real cell 124 at the subscriber terminal.

In an embodiment, the processor 116 is further configured to control the stand-alone base station 110 so that information transmitted in the control channel is modified in order to better force the subscriber terminal 106 to camp in the emulated cell 128.

In an embodiment, the location of the subscriber terminal 106 may be determined during the blocking of the service. The processor 116 may be configured to control the stand-alone base station 110 to prevent the release of a connection in the radio resource control protocol layer after a layer-three disconnection by not responding to the layer-three disconnection with a radio resource control protocol layer connection release. The processor may also be configured to control a direction finder 112 to find out the geographical location of the subscriber terminal 106 utilizing the not released connection in the radio resource control protocol layer.

The stand-alone base station 110 may also be used as the direction finder 112. If the integrity-protection is not turned on by the network after RRC connection setup, the subscriber terminal 106 will release the connection after some time, typically after 20 seconds. The time before the connection is released is used to take a bearing to the subscriber terminal 106 by using a directional antenna in the stand-alone base station 110. When the RRC connection is set up, RRC measurements in the subscriber terminal 106 are set on to measure the quality/strength of the stand-alone base station 110 transmission. A bearing to the subscriber terminal 106 may be taken by turning the directional antenna of the stand-alone base station 110. The subscriber terminal 106 is in a direction wherefrom the measurement reports indicate maximum reception level. It may be possible to select at least one subscriber terminal 106 as the target. When the target tries to make a location update to the system, the location update request is not answered and the RRC connection is not released, but the connection is left on and a measurement command is sent to the target. The measurement reports of the target report how much power it uses to keep a set SIR target. The lower the power value, the better the antenna is directed towards the target. The report values may be presented in the user interface so that the highest bars are reached with the lowest power values. The roundtrip time measurement may also be started for estimating the distance to the target. RTT (round trip time measurement from the base station) may utilize: NBAP/Dedicated Measurement/Dedicated Measurement Type: Round Trip Time. Reception power (from the subscriber terminal) may be: RRC/MEASUREMENT/UE internal measurement/UE Transmitted Power.

Next, a method will be described with reference to FIG. 2. The method relates to the blocking of service. The method starts in 200 and ends in 206. Other operations, besides those described in FIG. 2, may also be executed between the operations or within the operations.

In 202, an emulated cell is formed by transmitting a control channel with information of a real cell and with such a transmission power that a subscriber terminal of a cellular radio system is forced to camp in the emulated cell.

In 204, service is blocked from the subscriber terminal before an integrity protection process is performed by the subscriber terminal.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising a processor configured to
   control a stand-alone base station so that an emulated cell is formed by transmitting a control channel with information of a real cell and with such a transmission power that a subscriber terminal of a cellular radio system is forced to camp in the emulated cell, and
   control the stand-alone base station to block service from the subscriber terminal before an integrity protection process is performed between the stand-alone base station and the subscriber terminal.

2. The apparatus of claim 1, wherein the processor is further configured to control the stand-alone base station so that information transmitted in the control channel is modified in order to better force the subscriber terminal to camp in the emulated cell.

3. The apparatus of claim 1, wherein the processor is further configured to control the stand-alone base station to block the service from the subscriber terminal so that a service request message is received from the subscriber terminal and a service reject message is transmitted to the subscriber terminal.

4. The apparatus of claim 1, wherein the processor is further configured to control a measurement receiver to measure real cells of the cellular radio system, and to select one of the measured real cells as the emulated cell.

5. The apparatus of claim 4, wherein the processor is further configured to select as the emulated cell a real cell whose reception power at the measurement receiver is lower than reception power of the best received cell at the measurement receiver and whose location area code is the same as the location area code of the best received cell.

6. The apparatus of claim 1, wherein the processor is further configured to control the stand-alone base station to block the service in the protocol layer three.

7. The apparatus of claim 1, wherein the processor is further configured to control the stand-alone base station to block the service in the radio resource control protocol layer.

8. The apparatus of claim 1, wherein the processor is further configured to control the stand-alone base station to prevent the release of a connection in the radio resource control protocol layer after a layer-three disconnection by not responding to the layer-three disconnection with a radio resource control protocol layer connection release.

9. The apparatus of claim 8, wherein the processor is further configured to control a direction finder to find out the geographical location of the subscriber terminal utilizing the not released connection in the radio resource control protocol layer.

10. The apparatus of claim 1, wherein the processor is further configured to control the stand-alone base station so that information transmitted in the control channel is modified not to allow an emergency call by the subscriber terminal in the emulated cell in order to force the subscriber terminal to start an emergency call in a real cell.

11. The apparatus of claim 1, wherein the processor is further configured to control the stand-alone base station to operate as a wideband code division multiple access cell, and, if the subscriber terminal switches from the wideband code division multiple access cell to a time division multiple access cell, to control the stand-alone base station or another stand-alone base station to emulate that time division multiple access cell.

12. A computer program on a carrier and comprising computer executable instructions for causing an apparatus to
   control a stand-alone base station so that an emulated cell is formed by transmitting a control channel with information of a real cell and with such a transmission power that a subscriber terminal of a cellular radio system is forced to camp in the emulated cell, and
   control the stand-alone base station to block service from the subscriber terminal before an integrity protection process is performed between the stand-alone base station and the subscriber terminal.

13. An apparatus comprising
   means for controlling a stand-alone base station so that an emulated cell is formed by transmitting a control channel with information of a real cell and with such a transmission power that a subscriber terminal of a cellular radio system is forced to camp in the emulated cell, and
   means for controlling the stand-alone base station to block service from the subscriber terminal before an integrity protection process is performed between the stand-alone base station and the subscriber terminal.

* * * * *